United States Patent [19]
Tran

[11] Patent Number: 5,483,645
[45] Date of Patent: Jan. 9, 1996

[54] CACHE ACCESS SYSTEM FOR MULTIPLE REQUESTORS PROVIDING INDEPENDENT ACCESS TO THE CACHE ARRAYS

[75] Inventor: Thang M. Tran, Austin, Tex.

[73] Assignee: Advanced Micro Devices, Inc., Sunnyvale, Calif.

[21] Appl. No.: 20,370

[22] Filed: Feb. 22, 1993

Related U.S. Application Data

[63] Continuation of Ser. No. 603,545, Oct. 26, 1990, abandoned.

[51] Int. Cl.⁶ .................................................. G06F 13/16
[52] U.S. Cl. .................. 395/403; 364/230.6; 364/242.9; 364/964.2; 364/966.6; 395/447
[58] Field of Search .............................. 364/200 MS File, 364/900 MS File, 400, 425

[56] References Cited

U.S. PATENT DOCUMENTS

| | | | |
|---|---|---|---|
| 4,410,944 | 10/1983 | Kronies | 395/425 |
| 4,442,487 | 4/1984 | Fletcher et al. | 364/200 |
| 4,622,631 | 11/1986 | Frank et al. | 395/800 |
| 4,755,930 | 7/1988 | Wilson, Jr. et al. | 395/425 |
| 4,843,542 | 6/1989 | Dashiell et al. | 395/425 |
| 4,991,081 | 2/1991 | Bosshart . | |
| 4,995,041 | 2/1991 | Hetherington et al. | 395/425 |
| 5,029,070 | 7/1991 | McCarthy et al. | 395/425 |
| 5,045,996 | 9/1991 | Barth et al. | 395/425 |
| 5,091,846 | 2/1992 | Sachs et al. | 395/250 |
| 5,097,409 | 3/1992 | Schwartz et al. | 395/425 |
| 5,140,681 | 8/1992 | Uchiyama et al. | 395/425 |
| 5,210,849 | 5/1993 | Takahashi et al. | 395/425 |

Primary Examiner—Reba I. Elmore
Attorney, Agent, or Firm—Foley & Lardner

[57] ABSTRACT

The present invention is an apparatus comprising first and second addressable arrays and an input for receiving address information related to the arrays. A first request line receives from a first source first request signals for access to the first and second arrays based on the address information. A second request line receives from a second source second request signals for access to the first and second arrays based on the address information. A processing circuit transmits the address information to the first and second addressable arrays in response to the first and second request signals based on a priority of the first and second request signals.

29 Claims, 5 Drawing Sheets

CACHE ACCESS SYSTEM FOR MULTIPLE REQUESTORS PROVIDING INDEPENDENT ACCESS TO THE CACHE ARRAYS

CROSS-REFERENCE TO RELATED APPLICATIONS

This application is related to the copending application 07/596,549, filed Oct. 12 ,1990. This application is a continuation of application Ser. No. 07/603,545, filed Oct. 26, 1990, now abandoned.

BACKGROUND OF THE INVENTION

This invention relates to data processing systems using cache memories, and more particularly to systems for processing multiple access requests to the cache memories.

DISCUSSION OF RELATED ART

Cache systems are conventionally used with CPU's of all types to increase memory access speed. A conventional cache memory is interposed between the CPU and the main memory. The cache memory has a smaller capacity but a lower access time than the main memory. The cache memory, therefore, is used whenever possible, to satisfy a processor request.

Conventional cache memories include a STORE array for storing data, instructions, etc., and a TAG array for identifying the addresses in main memory from which the data in the STORE array was obtained. During an access request, the TAG array is first accessed to determine whether the information sought is in the STORE array. Access to the TAG array may be made using a multibit address which corresponds to a portion of an address in the main memory. If the sought after instruction is in the STORE array, the same multibit address used to access the TAG array can be used to access the required information in the STORE array.

Multiprocessor systems have become very popular recently. Such systems are used in a parallel processing environment. In order to increase the speed of such systems, each CPU can have its own cache memory. The cache memories are connected to a common main memory. Such a configuration leads to multiple requests of each cache memory. These requests must be processed efficiently and accurately for the system to operate properly. This task is complicated by the fact that separate requests can be made for access to the TAG array and to the STORE array. In order to enhance processing time, these separate requests should preferably be processed independently.

SUMMARY OF THE INVENTION

One object of the present invention is to provide an access system for a cache memory which enables effective and efficient access so as to enhance processor speed.

Another object of the present invention is to provide a cache memory access system which processes TAG array access requests and STORE array access requests independently whenever possible.

A further object of the present invention is to provide a cache memory access system which provides sequential access to a TAG array and a data array based on the same address information.

In accordance with the above, the present invention is an apparatus comprising first and second addressable arrays and an input for receiving address information related to the arrays. A first request line receives from a first source first request signals for access to the first and second arrays based on the address information. A second request line receives from a second source second request signals for access to the first and second arrays based on the address information. A processing circuit transmits the address information to the first and second addressable arrays in response to the first and second request signals based on a priority of the first and second request signals.

First and second latches are provided for latching the address information related to the first and second request signals.

In accordance with other aspects, the invention is an apparatus comprising a cache memory having an independently accessible TAG array and an independently accessible STORE array. An address input receives address signals related to the TAG and STORE arrays and a plurality of access request lines receive access request signals from different sources. A latch is associated with each access request line for latching address information on the address line. The address information is selectively passed by one circuit to the TAG array and by another circuit to the STORE array.

BRIEF DESCRIPTION OF THE DRAWINGS

The foregoing and other objects of the invention will become more readily apparent as the invention becomes more fully understood based on the detailed description below, reference being had to the accompanying drawings in which like reference numerals represent like parts and in which.

DETAILED DESCRIPTION OF THE PREFERRED EMBODIMENTS

Figure 1:
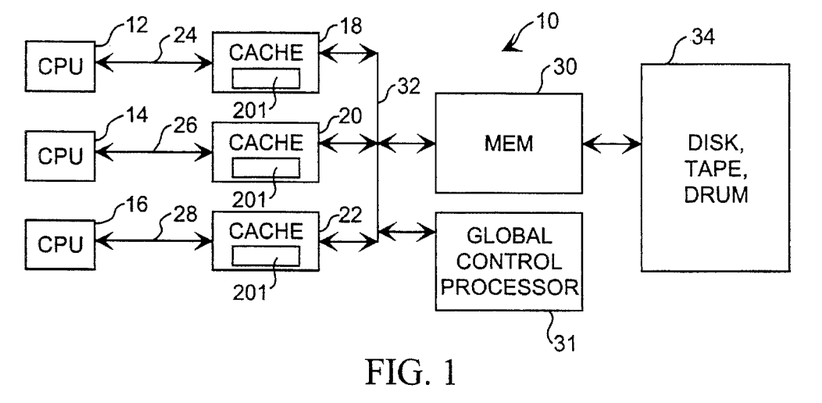
FIG. 1 is block diagram of a multiprocessor system according to the present invention.

FIG. 1 shows a multiple CPU multiple cache processing system 10. System 10 includes 3 CPU's 12, 14 and 16 connected to respective cache memories 18, 20 and 22 through buses 24, 26, and 28, respectively. The caches 18, 20, 22 are connected to a main memory 30 through a common bus system 32. Memory 30 can communicate with an external storage device such as a disk, tape, drum or the like 34.

System 10 is set up so that each cache 18, 20, 22 can receive three types of access requests. One such request comes from the associated CPU 12, 14, 16 and is referred to as a processor request. A second type of request, known as a command request, is generated by a global control processor 31 and relates to the operation of the cache itself in connection with memory 30. Various types of cache systems are known in the art. The type used in the present system is called a copyback cache. This operates by storing all available data for the associated CPU and transferring the stored data to the main memory 30. Each storage location of the cache contains a status bit which is set when the information in that location is updated but yet not transferred to the main memory 30. Periodically, such as at the end of a processing cycle, a global control processor 31 requires modified information to be transferred to the main memory 30. Such a transfer results in a command access to the cache. Finally, each cache monitors bus 32 to determine if a request is being made of memory 30 for data which is updated and stored only in the monitoring cache. This operation is referred to as "bus watching" and results in a data intervention signal being asserted to prevent access to memory 30 so that the required data can be supplied by the cache having the data. These operations are conventional and will not be discussed in further detail.

Figure 2:
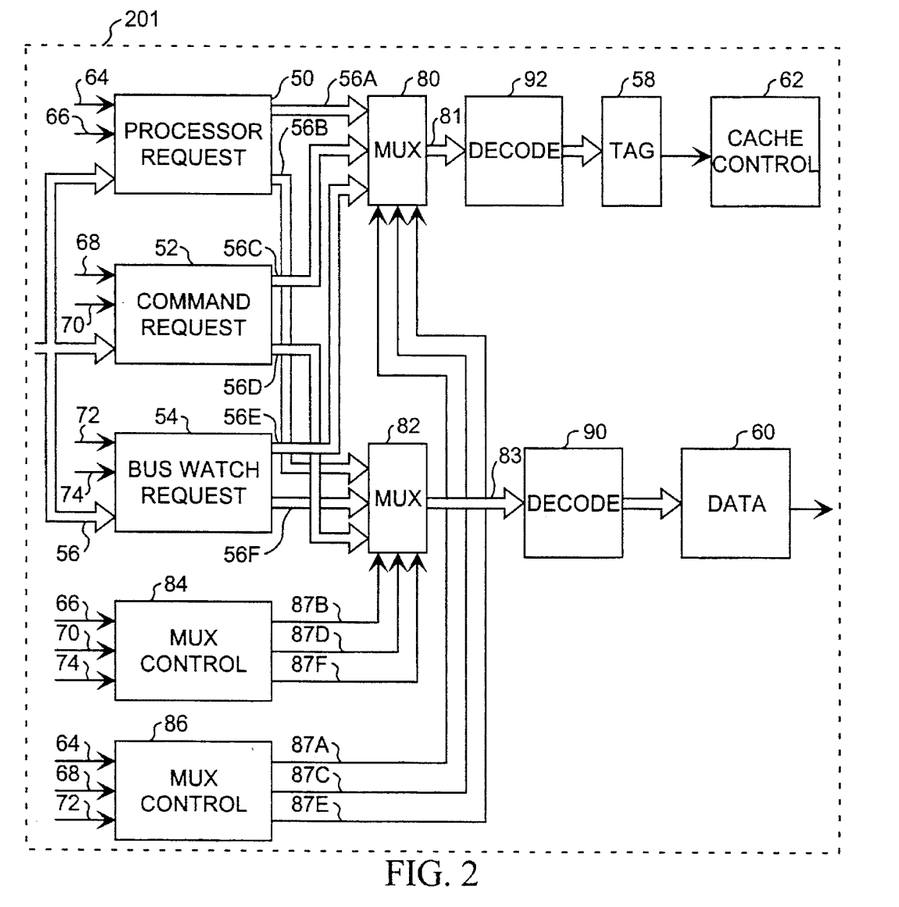
FIG. 2 is a block diagram depicting the operation of the cache memory access system of the present invention.

FIG. 2 shows a block diagram of the circuit 201 of the present invention. One such circuit 201 is provided within each cache 18, 20, 22. The circuit of FIG. 2 includes a processor request processing block 50, a command request processing block 52 and a bus watch request processing block 54. Each of these blocks 50, 52 and 54 receives address information from an address bus 56 which contains the address of the location to be accessed. Each block 50, 52 and 54 also contain a pair of request inputs for requesting access either to TAG array 58 or data array 60. As is conventional in cache memories, TAG array 58 contains a plurality of addressable registers which indicate which addresses of main memory 30 are stored in corresponding addressable registers of data array 60. This information is transmitted through cache controller 62 which is responsible for identifying a hit to determine whether the request can be serviced by accessing DATA array 60 rather than main memory 30.

Each of the blocks 50, 52 and 54 requires two inputs since the TAG array 58 and data array 60 are individually accessible. Request line 64 of processor request block 50 indicates a request for access to TAG array 58 whereas request line 66 is a request for access to data array 60. Similarly, request line 68 indicates a command request for TAG array 58 and request line 70 indicates a command request for data array 60. Finally, a signal on line 72 indicates a bus watch request for TAG array 58 and a signal on line 74 indicates a bus watch request for access to data array 60. The DATA array access requests can be generated by cache control 62 if a hit is detected in TAG array 58. Such operation is conventional and will not be discussed in detail here.

The address information from the various processing blocks 50, 52 and 54 is passed to a pair of multiplexers 80 and 82 which are operated by multiplex controllers 84 and 86. The address information received on bus 56 is the same for each block 50, 52 and 54. These blocks serve to store the address data and pass it to the appropriate multiplexer along buses 56A, 56B, 56C, 56D, 56E and 56F depending on the asserted request signal on lines 64, 66, etc. Blocks 50, 52 and 54 also ensure that the address data sent to multiplexer 82 is first channelled to multiplexer 80, as will be discussed below.

The multiplexers 80 and 82 are controlled by multiplex select controllers 84 and 86 through multiplex select lines 87A–87F to activate multiplexers 80 and 82 to cause these multiplexers to pass address data respectively from buses 56A–56F to a pair of decoders 90 and 92 which then access the appropriate locations in arrays 60 and 58, respectively.

Multiplex controllers 84 and 86 operate according a predetermined priority. For example, bus watching requests may be given highest priority in which case a bus watch TAG access request on line 72 or bus watch data access request on line 74 would be processed first resulting in TAG array multiplex select line 87E or DATA array multiplex select line 87F being asserted to cause multiplexers 80 and 82 to pass address data on buses 56E or 56F to multiplexer output buses 81 and 83, respectively. It should be understood that multiplex controllers 84 and 86 operate independently so that the TAG array 58 and DATA array 60 may be accessed simultaneously.

Figure 3:
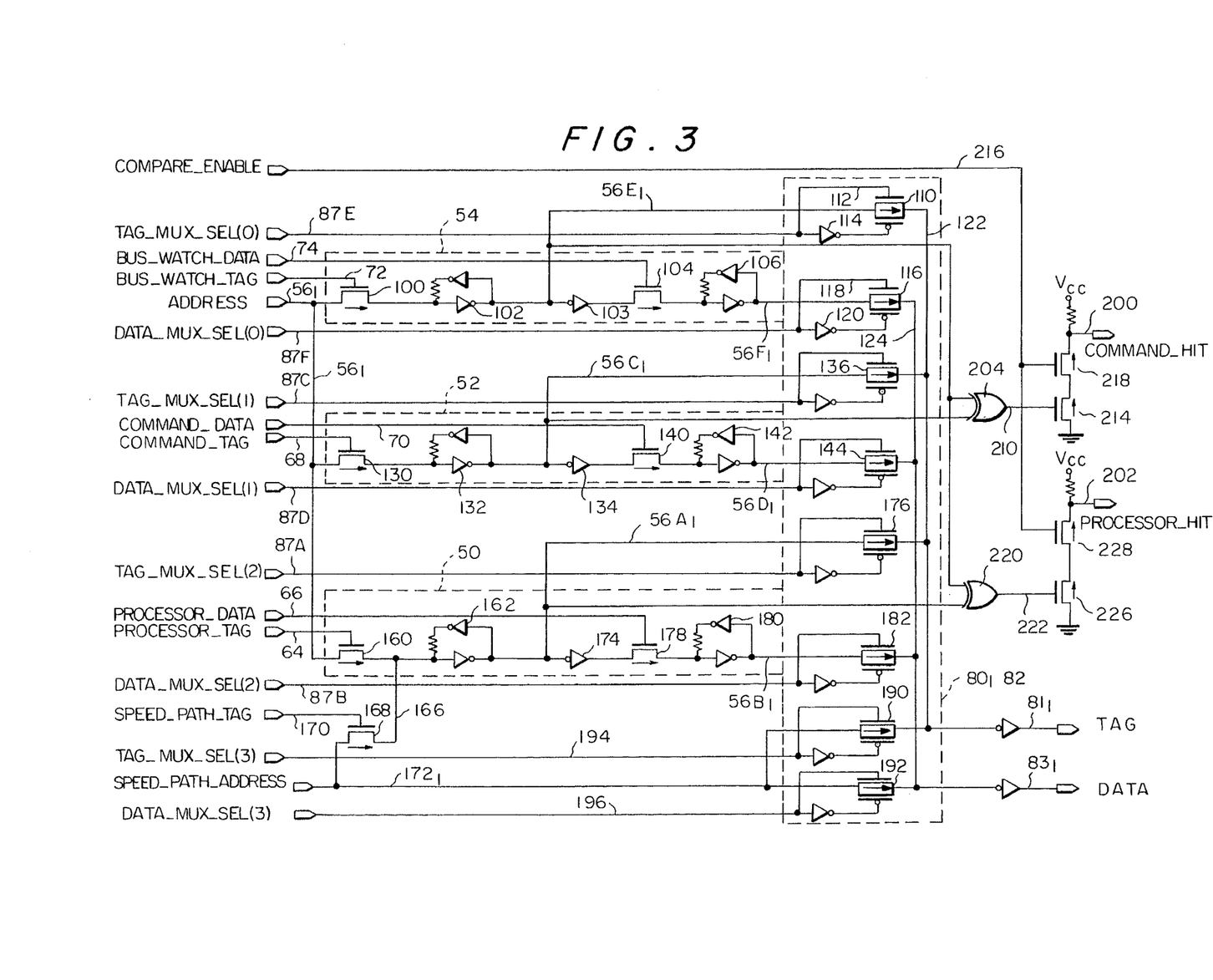
FIG. 3 is schematic diagram of the request storage and multiplex circuits of FIG. 2.

FIG. 3 shows schematically the processor request block 50, the command request block 52, the bus watch block 54 and multiplexers 80 and 82 together with related circuitry. It should be understood that the diagram of FIG. 3 relates to a single bit line $56_1$ of address bus 56. This circuitry, therefore, must be duplicated for each bit line of the address bus.

As shown in FIG. 3, bus watch processing block 54 comprises FET 100 which has, its drain connected to address bit line $56_1$ and its source connected an inverting latch 102. The gate of FET 100 is connected to the bus watch TAG array access request line 72. The inverting latch 102 output is passed to an inverter 103 as well as to bit line $56E_1$ which is a single bit line of bus 56E. This bit line is input to multiplexer 80. The output of inverter 103 is connected to the drain of a second FET transistor 104 whose gate is connected to bus watch data array request line 74 and whose source is connected to a second inverting latch 106. The output of inverting latch 106 is connected to bit line $56F_1$ which is one bit line of bus 56F. This bit line leads to multiplexer 82.

Multiplexers 80 and 82 are shown in FIG. 3 as comprising a plurality of CMOS switches controlled by respective multiplex select lines. For example, bit line 56E is connected to the input of CMOS switch 110 and DATA array multiplex select line 87E is connected to the complementary inputs of switch 110 through line 112 and inverter 114. Similarly, line $56F_1$ is connected to the input of switch 116 and TAG array multiplex select line 87F is connected to opposite gates of the switch through line 118 and inverter 120. The output of switch 110 is received on line 122 and the output of switch 116 is received on line 124. Command block 52 operates in a manner similar to bus watch block 54 with TAG bit line $56_1$ forming an input to FET transistor 130, the output of transistor 130 latching inverting latch 132, the output of latch 132 being provided to the input of inverter 134 and to CMOS switch 136 through line $56C_1$, the output of inverter 134 being provided to the input of transistor 140 whose output is connected to inverting latch 142. The output of latch 142 is provided to a CMOS switch 144. Transistors 130 and 140 are controlled by command TAG array request line 68 and command DATA array request line 70, respectively. Switch 136 is connected to line 122 and switch 144 is connected to line 124.

Processor block 50 has essentially the same construction with one minor variation. In block 50, a transistor 160 has its input connected to address bit line $56_1$ and its output connected to inverting latch 162, its gate being controlled by processor TAG request line 64. In addition, latch 162 receives an input from line 166 which is the output of a transistor 168. The gate of transistor 168 is connected to a speed path TAG access request line 170 and its input is connected to a speed path address bit line $172_1$ which is one bit line of an address bus used for speed path functions. The remainder of block 50 is the same as blocks 52 and 54 with the output of inverting latch 162 connected to the input of inverter 174 and to a CMOS switch 176 through line 56A₁. The output of inverter 174 is connected to the input of transistor 178 whose gate is controlled by DATA multiplex select line 66. The output of transistor 178 is connected to a second inverting latch 180 whose output is connected to the input of CMOS switch 182. The gates of switch 176 are controlled by TAG multiplex select line 87A and the gates of switch 182 are controlled by DATA array multiplex select line 87B.

Speed paths are sometimes provided in processors to enhance processing speed under certain conditions. The present invention is adapted for use in such an environment and includes the speed path address bus 172 of which line 172₁ is a single bit line. In addition to being connected to transistor 168, line 172₁ is connected to the input of a CMOS switch 190 and to the input of a CMOS switch 192. Switch 190 is controlled by a TAG multiplex select line 194 and switch 192 is connected by a DATA array multiplex select line 196. During speed path operation, the processor causes an address to be passed along bus 172, activates line 172 and activates line 194 or line 196 depending on whether access is requested to the TAG array or DATA array. The speed line bypasses latch 162, inverter 174, transistor 178 and latch 180 thereby eliminating the inherent delays caused by the elements. However, in the event that the appropriate switch 190 or 192 has not been actuated by the multiplexer, switch 168 also passes the speed path address data to the input to latch 162 so that the address information can be stored and processed in turn. With this configuration, a speed path is used if available but, if not available, the normal processing path is used.

Another feature of the circuit in FIG. 3 is the generation of a command hit or processor hit signal on lines 200 or 202, respectively, in the event that a bus watch TAG access request occurs at the same time and for the same address as a command TAG access request or a processor TAG access request. The circuit comprises an exclusive OR gate 204 which receives one input from line 56E₁ and a second input from line 56C₁. Accordingly, the output of exclusive OR gate 204 on line 210 is held low when the signals at its input are the same, and transistor 214 is held off. If a high signal is asserted on compare enable line 216, transistor 218 is turned on causing command hit line 200 to go low when transistor 214 is also on. Accordingly, a high signal in line 200 when a compare enable signal is asserted indicates a command hit. A command hit line 200 is provided for each bit of the address bus so that if all command hit lines are high at the same time when the compare enable line is high, a hit is indicated.

The operation is similar for exclusive OR gate 220 which receives inputs from line 56E₁ and 56A₁ and provides an output through line 222 to transistor 226. Transistor 228 is responsive to the signal on compare enable line 216. If the output of exclusive OR gate 220 is low, transistor 226 is turned off causing processor hit line 202 to remain high if a signal is asserted on compare enable line 216. A single command hit line 200 is connected to each bit of the address bus so that any unmatch-compare of any bit when the compare enable line is high will cause the command hit line to go low, otherwise, if the command hit line remains high, a hit is indicated.

Command hit signals and processor hit signals are provided to the global control processor to indicate that accesses to the DATA and TAG arrays must be serialized. In other words, in the absence of a hit signal, it is possible to carry out several operations, such as a read operation and a write operation in the same location in the DATA array. However, if concurrent requests are being made, all operations must be serialized.

Figure 4:
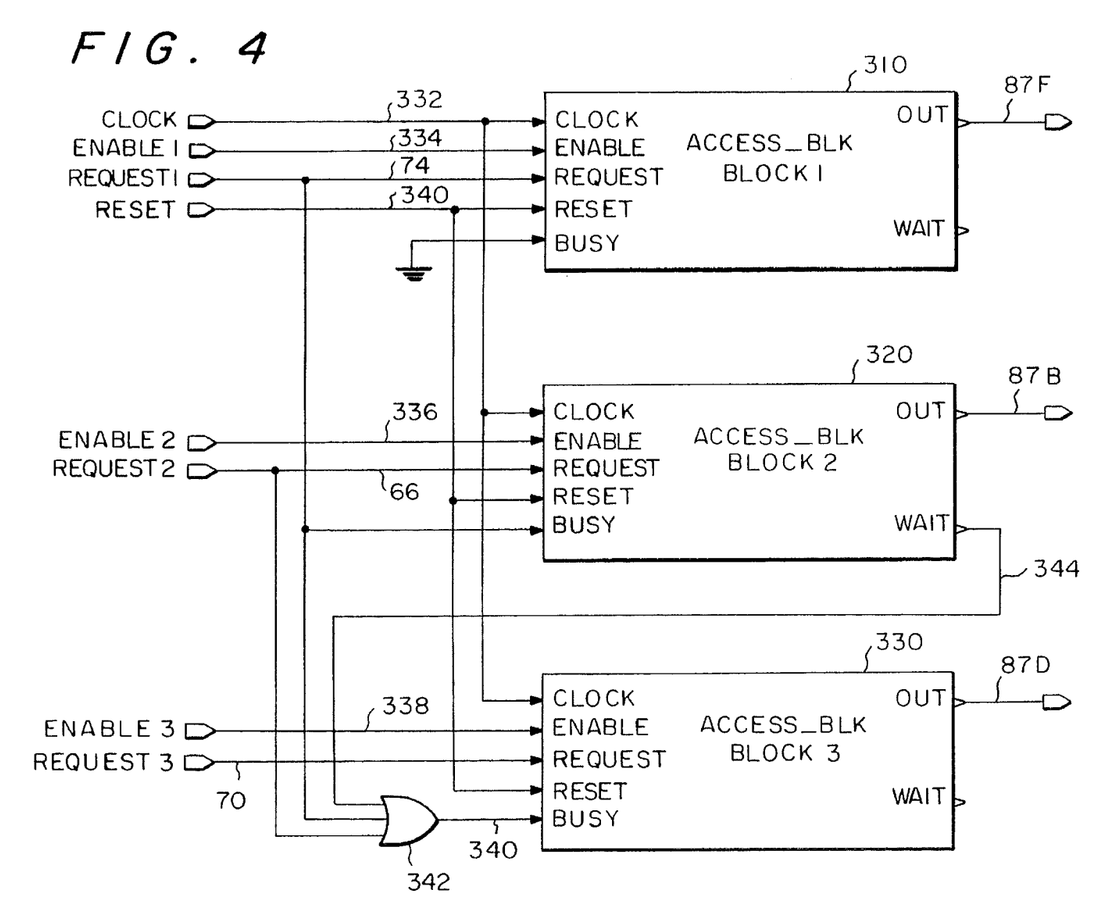
FIG. 4 is a block diagram of the priority based multiplex control of FIG. 2.

FIG. 4 shows one multiplex controller of FIG. 2. It will be assumed that the controller in FIG. 4 is multiplex controller 84, it being understood that controller 86 has an identical configuration.

Controller 84 contains three access blocks 310, 320 and 330. The outputs of the access blocks comprise multiplex select lines 87F, 87B, and 87D. Each block also has a clock input which accepts clock pulses on line 332 for synchronization. Each block also has an enable input to accept an enable signal on a respective enable line 334, 336 or 338. Each block also has a reset input to accept a reset signal on line 340.

Each block also has a request input to receive a respective access request signal. Block 310 receives bus watch DATA array access request line 74, block 320 receives processor DATA array request line 66 and block 330 receives command DATA array access request line 70. Each block also has a BUSY input which receives a high signal to prevent that block from producing an output.

It will be seen that the BUSY input to block 310 is grounded so that block 310 is always enabled to produce an output on line 87F whenever it receives a request on line 74. The BUSY input of block 320 receives as its input request line 74 so that block 320 is prevented from producing an output on line 87B whenever a request is being made to block 310.

Each block also has a wait output which is asserted whenever that block has received a request on its request input and a high signal on its BUSY input and has not yet serviced that request. The BUSY input of block 330 receives the output on line 340 from an OR gate 342. The input to the OR gate comprises lines 74 and 66 as well as line 344 from the wait output of block 320. Accordingly, the BUSY input of block 330 receives a high signal whenever a request is being made to block 310, a request is being made to block 320, or block 320 is in a wait state.

As will be understood, the connections discussed above produce a priority response in which bus watch access requests on line 74 are processed with highest priority, processor requests on line 66 are processed with second highest priority, and command requests on line 70 have lowest priority.

Figure 5:
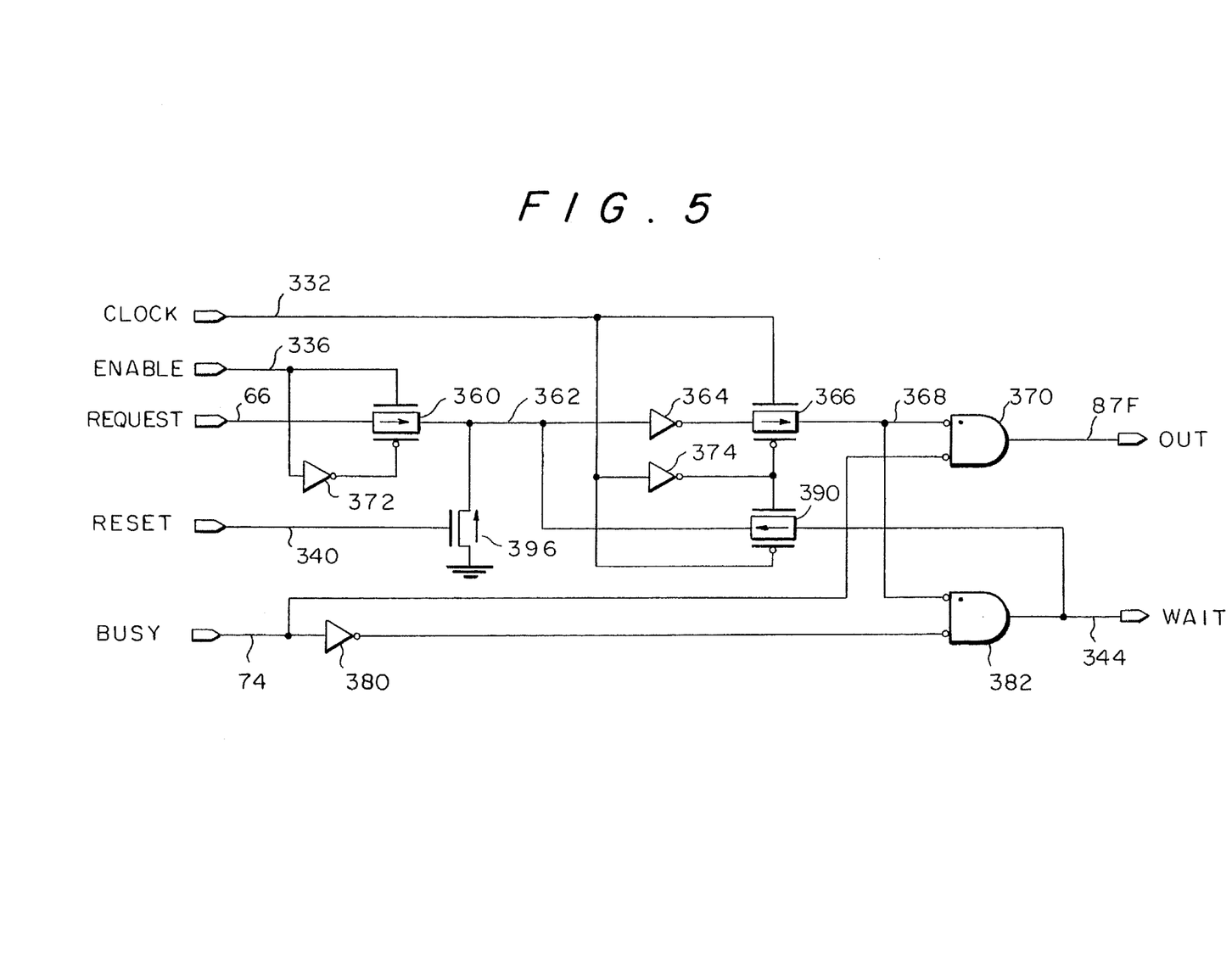
FIG. 5 is a schematic diagram of one access block of FIG. 4.
Figure 6:
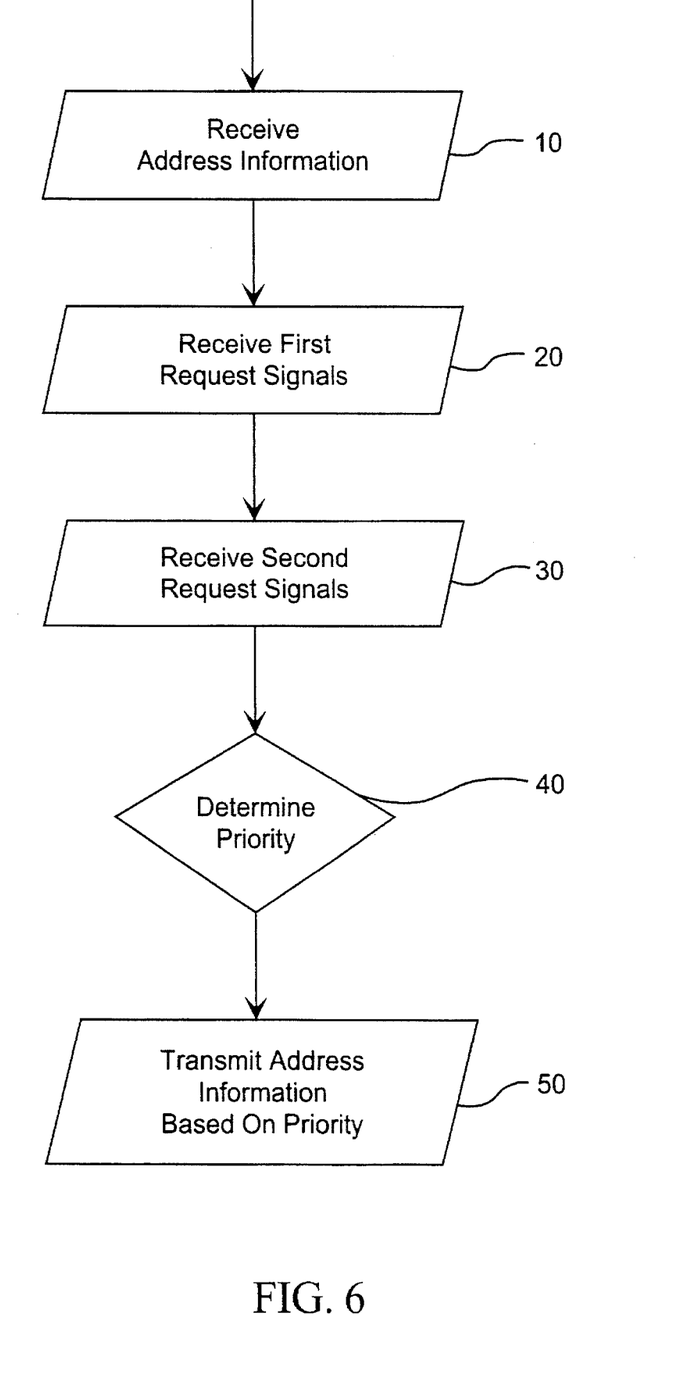
FIG. 6 is a flowchart showing the method of operation.

FIG. 5 shows a circuit which is duplicated in each of the blocks 310, 320 and 330. For ease of reference, it will be assumed that FIG. 5 is the circuit of block 320, it being understood that the other blocks have the same circuits.

As seen in FIG. 5, request line 66 is input to a CMOS switch 360 whose output is passed along line 362 to inverter 364. The output of inverter 364 is received at the output of a second CMOS switch 366 whose output is passed along line 368 to an inverted input of a AND gate 370.

One gate of switch 360 is connected to line 336 and the complementary gate is connected through inverter 372 to line 336 so that a high signal line on line 336 opens switch 360 to pass a request signal on line 64 to inverter 364 which passes the signal to switch 366. One gate of switch 366 is connected to clock line 332 while a complementary input is connected through inverter 374 to clock line 332. The clock pulse is a bi-phase clock pulse so that switch 366 is opened on positive going half cycles to pass the output of inverter 364 to line 368.

The other input of AND gate 370 is the inverted signal on line 74. Therefore, it can be seen that if line 74 is low, request signals on line 66 are passed directly to line 87F during positive clock pulses when the enable signal is asserted.

When the BUSY input is high, the signal on line 74 is inverted by inverter 380 and passed to an inverting input of AND gate 382. The other input of gate 382 is the inverted signal on line 368. The output of AND gate 382 is wait line 344. This line is passed to the input of a CMOS switch 390 whose output is connected to the input of inverter 364. One gate of switch 390 is connected to the output of inverter 374 and the complementary gate is connected clock line 332 so that switch 390 is activated to pass the signal on line 344 to inverter 364 during negative half cycles of the clock signal on line 332.

As will be understood from FIG. 5, a request received on line 66 during the presence of a BUSY signal on line 74 causes the request signal to be latched onto line 368. This latching takes place due to the high signal on BUSY line 74 in conjunction with the high signal on request line 66 resulting in a high output of AND gate 382 during a positive clock signal half cycle. The high output of AND gate 382 is returned during negative clock half cycles through switch 390 to maintain a high request signal on line 362. It will be understood that finite time is required for the output of a CMOS switch to decay when the switch is turned off. Thus, a high signal on the input of switch 390 causes a high output of switch 390 during negative half cycles and the output decays slowly during positive half cycles when switch 390 is turned off. As a consequence of this slow decay and the clock speed, whenever line 344 is high, the output of switch 390 appears to be continuously high causing the output of inverter 364 to be continuously low. This results in the output of switch 366 being continuously low to maintain a low signal at the inverting inputs of gates 370 and 382. When the BUSY signal on line 74 is deasserted, the output of gate 370 goes high asserting the signal on line 87F. At the same, the output of gate 382 goes low causing the output of switch 390 to go low at the next negative clock cycle.

As will also be understood, a reset signal on line 340 causes line 362 to go low by turning on FET 396. This resets the signal on line 87F to a low state.

As will also be understood, an enable signal should asserted on line 336 whenever it is desired that the system respond to bus watch access request.

Returning to FIG. 4, it can be seen that more or less access blocks can be provided depending on the number of possible access requests. Also, blocks can be disabled individually if it is desired to eliminate responses to certain access requests. The enable and reset lines of each block 310, 320 and 330 are controlled from the associated microprocessor in a manner which would be readily apparent to one skilled in the art.

The foregoing has been set forth to illustrate the present invention but is not deemed to limit the scope of protection being sought. It is clear the numerous addition, modifications and other changes could be made to the invention without departing from the scope of the appended claims.

What is claimed is:

1. A cache memory means apparatus comprising:

a first addressable array means in the cache memory means;

a second addressable array means in the cache memory means;

first request receiving means, connected between an address bus means and said first and second addressable array means, for receiving first address information from said address bus means and for receiving first request signals from a first source means and for accessing said first and second array means using said first address information;

second request receiving means, connected between said address bus means and said first and second addressable array means, for receiving second address information from said address bus means and for receiving second request signals from a second source means and for accessing said first and second means using said second address information; and transmitting means, connected between said first and second request means and said first and second addressable array means for selectively using said first and second request signals for simultaneously transmitting a portion of said first address information to one of said first or second addressable array means while a portion of said second address information is selectively transmitted to the other of said first and second addressable array means.

2. An apparatus according to claim 1 wherein:

said first request means includes means for latching said address information when said first request signals are active and outputting first latched address information, said transmitting means transmitting said first latched address information in response to said first request signals;

said second request means includes means for latching said address information when said second request signals are active and outputting second latched address information, said transmitting means transmitting said second latched address information in response to said second request signals.

3. An apparatus according to claim 2 further including a third request receiving means, connected between said address bus means and said first and second addressable array means, for receiving third request signals from a third source means for accessing said first and second array means using said address information, said third request means including means for latching said address information when said third request signals are active and outputting third latched address information to said transmitting means, said transmitting means transmitting said third latched address information in response to said third request signals, said transmitting means transmitting said first, second and third latched address information to said first and second arrays in response to said first, second and third request signals based on a predetermined priority of said first, second and third request signals.

4. An apparatus according to claim 3 wherein said first request signals comprise a first tag and a first data request signal, said second request signals comprise a second tag and a second data request signal and said third request signals comprise a third tag and a third data request signal.

5. An apparatus according to claim 4 wherein said transmitting means includes:

a first multiplexer control circuit receiving said first, second and third tag request signals and outputting first control signals; and a first multiplexer receiving said first, second and third latched address information and transmitting one of said first, second and third latched address information to said first addressable array means in response to said first control signals;

6. An apparatus according to claim 5 wherein said transmitting means further includes:

a second multiplexer control circuit receiving said first, second and third data request signals and outputting second control signals; and a second multiplexer receiving said first, second and third latches address information and transmitting one of said first, second and third latched address information to said second addressable array means in response to said second control signals.

7. An apparatus according to claim 6 wherein said first and second multiplexer control circuits store said request signals and issue said request signals in order of their predetermined priority.

8. An apparatus according to claim 2 wherein said first request means receives a first signal for requesting access to said first addressable array means and a second signal for requesting access to said second addressable array means, and said means for latching address signals associated with said first request signals includes a first latch for latching address information in response to said first signal and a second latch for latching address information received from said first latch in response to said second signal, said first latch containing address information for said first addressable array means and said second latch containing address information for said second addressable array means.

9. An apparatus according to claim 8 wherein said second request means receives a third signal for requesting access to said first addressable array means and a fourth signal for requesting access to said second addressable array means, and said means for latching address signals associated with said second request signals includes a third latch for latching address information in response to said third signal and a fourth latch for latching address information received from said third latch in response to said fourth signal, said third latch containing address information for said first addressable array means and said second latch containing address information for said second addressable array means.

10. An apparatus according to claim 9 including means for comparing address information latched in said first latch to address information latched in said third latch, and outputting a comparison result.

11. An apparatus according to claim 9 including a separate address input for bypassing said request block latches for a speed path to said first and second addressable array means, said separate address input also being latched in said latching means for later use if priority prevents immediate access by said separate address input to said first and second addressable array means.

12. An apparatus according to claim 10 wherein said first request signals comprise processor request signals and said second request signals comprise bus watch request signals, said comparison result being a processor hit signal.

13. An apparatus according to claim 10 wherein said first request signals comprise command request signals and said second request signals comprise bus watch request signals, said comparison result being a command hit signal.

14. An apparatus according to claim 1 wherein said transmitting means established different request signal priorities for said first and second array means.

15. An apparatus according to claim 14 wherein said transmitting means includes a multiplexer.

16. An apparatus according to claim 1 wherein said first addressable array means comprises a store array of said cache memory means.

17. An apparatus according to claim 16 wherein said second addressable array means comprises a tag array of said cache memory means.

18. An apparatus according to claim 17 wherein said first source means comprises a processor request source.

19. An apparatus according to claim 18 wherein said second source means comprises a bus watching source.

20. An apparatus according to claim 18 wherein said second source means comprises a cache command source.

21. A method of accessing means in a cache memory means, comprising the steps of:

receiving address information for first and second addressable array means;

receiving first request signals from a first source means for accessing said first and second array means, with a portion of said first request signals for accessing said first addressable array means and another portion of said first request signals for accessing said second addressable array means, and for latching first address information from an address bus means when one of said first request signals is active;

receiving second request signals from a second source means for accessing said first and second array means, one with a portion of said second request signals for accessing said first addressable array means and another portion of said second request signals for accessing said second addressable array means, and for latching second address information when one of said second request signals is active; and selectively transmitting portions of first and second address information to said first and second addressable array means simultaneously via separate paths in response to said first and second request signals based on a priority of said first and second request signals.

22. An apparatus, comprising:

a cache memory means having an independently addressable tag array means and an independently addressable store array means;

a plurality of access request line means for receiving access request signals from different source means;

a plurality of sets of latch means connected to an address bus means for receiving address signals for said tag and store array means from said address bus means, each latch means of each set of said plurality of sets of latch means receiving one of said address signals, one of said sets of said plurality of sets of latch means being associated with each of said access request line means for latching address information;

said access request line means and associated said plurality of sets of latch means comprising a first group associated with said tag array means and a second group associated with said store array means;

first means for selectively passing address information in said plurality of sets of latch means associated with access request line means in said first group to said tag array means; and second means for selectively passing address information in said plurality of sets of latch means associated with access request line means in said second group to said store array means via a path independent of said first means for selectively passing address information.

23. An apparatus according to claim 22 wherein said request line means from an identical source means are arranged together with their associated set of said plurality of sets of latches and wherein a first request line means from said identical source means is connected to gate address information to a first latch means of a pair of latch means, and a second request line from said identical source means is connected to gate said address information from said first latch means of said pair of latch means to the second latch means of said pair of latch means.

24. An apparatus according to claim 23 wherein said first means for selectively passing address information comprises a first multiplexer.

25. An apparatus according to claim 24 wherein said second means for selectively passing address information comprises a second multiplexer.

26. An apparatus according to claim 25 including means for controlling said first multiplexer according to a first priority scheme.

27. An apparatus according to claim 26 including means for controlling said second multiplexer according to a second priority scheme.

28. A cache memory means apparatus, comprising:
- a first addressable array means in said cache memory means;
- a second addressable array means in said cache memory means;
- first request receiving means for receiving a first and second request signal from a first source means for accessing said first and second addressable array means, respectively;
- a second request receiving means for receiving a third and fourth request signal from a second source means for accessing said first and second addressable array means respectively;
- a plurality of address means, one of said plurality of address means being respectively associated with said first and second request receiving means, for receiving address information for said first and second addressable array means; and
- first and second transmitting means, receiving address information from each of said plurality of address means, for selectively transmitting said address information to said first and second addressable array means respectively, according to a predetermined priority of said first, second, third and fourth request signals.

29. An apparatus according to claim 28 wherein:
- said first request receiving means includes means for latching said address information according to said first and second request signals and outputting first and second latched address information to said first and second transmitting means;
- said second request receiving means includes means for latching address information according to said third and fourth request signals and outputting third and fourth latched address information to said first and second transmitting means;
- said first transmitting means transmitting said first and third latched address information to said first addressable array means, in response to said first and third request signals; and
- said second transmitting means transmitting said second and fourth latched address information to said second addressable array means, in response to said second and fourth request signals.

* * * * *